(12) United States Patent
Pellenbarg et al.

(10) Patent No.: US 11,279,626 B2
(45) Date of Patent: Mar. 22, 2022

(54) OCTAMETHYLCYCLOTETRASILOXANE INTERACTS WITH LITHIUM IONS

(71) Applicant: Board of Trustees of the California State University, Long Beach, CA (US)

(72) Inventors: Robert E. Pellenbarg, San Bernardino, CA (US); Kimberley R. Cousins, San Bernardino, CA (US)

(73) Assignee: Board of Trustees of the California State University, Long Beach, CA (US)

( * ) Notice: Subject to any disclaimer, the term of this patent is extended or adjusted under 35 U.S.C. 154(b) by 317 days.

(21) Appl. No.: 16/438,189

(22) Filed: Jun. 11, 2019

(65) Prior Publication Data

US 2020/0010334 A1   Jan. 9, 2020

Related U.S. Application Data

(60) Provisional application No. 62/684,100, filed on Jun. 12, 2018.

(51) Int. Cl.
| | | |
|---|---|---|
| *C01D 15/00* | (2006.01) | |
| *C07F 7/21* | (2006.01) | |
| *C22B 7/00* | (2006.01) | |
| *C22B 26/12* | (2006.01) | |

(52) U.S. Cl.
CPC ............... *C01D 15/00* (2013.01); *C07F 7/21* (2013.01); *C22B 7/006* (2013.01); *C22B 26/12* (2013.01)

(58) Field of Classification Search
CPC ........... C01D 15/00; C07F 7/21; C22B 7/006; C22B 26/12
USPC ........................................................ 423/179.5
See application file for complete search history.

(56) References Cited

U.S. PATENT DOCUMENTS

2011/0174739 A1   7/2011  Chung et al.
2012/0302779 A1  11/2012  Ueda

FOREIGN PATENT DOCUMENTS

| EP | 0020483 A1 | 1/1981 |
|---|---|---|
| WO | 80/00796 A1 | 5/1980 |

OTHER PUBLICATIONS

International Search Report and Written Opinion for Application No. PCT/US2019/036607 dated Sep. 25, 2019 (44 pages).

(Continued)

*Primary Examiner* — Melissa S Swain
(74) *Attorney, Agent, or Firm* — Michael Best & Friedrich LLP

(57) ABSTRACT

Provided is a method of extracting a metal ion, which comprises contacting a compound of formula $(R_2SiO)_n$ with a source of the metal ion, whereby the compound and the metal ion form a complex, wherein each R is independently $C_{1-10}$alkyl, and n is 3-10.

19 Claims, 3 Drawing Sheets
(1 of 3 Drawing Sheet(s) Filed in Color)

(56) References Cited

OTHER PUBLICATIONS

Liotta et al., 12-Crown-4, e-EROS Encyclopedia of Reagents for Organic Synthesis; 2001, <http://onlinelibrary.wiley.com/doi/10.1002/047084289X.rc262/abstract>.

Xu et al., "A Review of Processes and Technologies for the Recycling of Lithium-ion Secondary Batteries," Journal of Power Sources, 2008, 177(2):512-527.

Cyclosiloxanes Information Center <https://www.cyclosiloxanes.org/>, accessed Aug. 2017.

Decken et al., "Cyclic Dimethylsiloxanes as Pseudo Crown Ethers: Syntheses and Characterization of Li(Me2SiO)5[Al{OC(CF3)3}4], Li(Me2SiO)6[Al{OC(CF3)3}4], and Li(Me2SiO)6[Al{OC(CF3)2Ph}4]," Angew. Chem. Int. Ed., 2006, 45 (17):2773-2777.

18-Crown-6

12-crown-4

Background

Red=Oxygen
Gold=Silicon
Grey= Carbon
White = Hydrogen
Violet = Lithium

OCTAMETHYLCYCLOTETRASILOXANE INTERACTS WITH LITHIUM IONS

CROSS-REFERENCE TO RELATED APPLICATIONS

This application claims the benefit of U.S. Provisional Patent Application No. 62/684,100, filed Jun. 12, 2018, which is incorporated herein by reference in its entirety.

STATEMENT OF GOVERNMENT INTEREST

This invention was made with government support under grant number HRD-1345163 awarded by the National Science Foundation. The government has certain rights to this invention.

BACKGROUND

Lithium is in a global demand for the industrial production of many important devices, such as batteries and aviation products. A vast majority of lithium come from brines or from minerals such as spodumene or other lithium ores. Lithium recovery usually relies on brines. The recovery processes such as electrodialysis and solvent extraction involve the use of caustic chemicals like sulfuric acid to acquire lithium from spodumene or ores that can severally damage wild life habitats and constitute health hazard to people. Herein, the use crown ethers analogs in the recovery of lithium from brines is reported as a potential alternative to more hazardous chemicals.

Crown ethers are widely used to chelate alkali metal ions, and 12-crown-4 has been shown to interact selectively with lithium ions. Without additional organic substituents, crown ethers are highly soluble in water; for example 18-crown-6 has a log (octanol/water) coefficient of −0.68, meaning the ether is almost five times as soluble in water compared to octanol. Metal chelation in crown ethers occurs through interaction of the oxygen atoms with a metal ion. Crown ethers have been used for moving ions (including lithium) across non-polar membranes or enriching lithium isotopes. However, crown ethers are highly toxic, and are typically used after being dissolved in an organic solvent, and not used as a neat liquid. Thus, there may be cost and environmental safety issues associated with the use of crown ethers for metal extraction.

Therefore, there remains a need for alternative materials that provide efficiency, high yield, and convenience for use in lithium recovery.

SUMMARY

In one aspect, the present disclosure provides a method of extracting a metal ion from a source, the method comprising:

contacting a compound of formula $(R_2SiO)_n$ with the metal ion in the source, whereby the compound and the metal ion form a complex;

wherein each R is independently selected from $C_{1-10}$alkyl, and n is 3-10.

In some embodiments, the metal ion is a lithium ion.

In some embodiments, the compound is of formula (I):

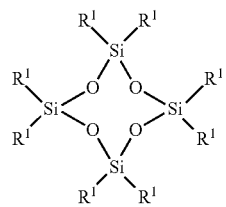

wherein each $R^1$ is independently selected from $C_{1-4}$alkyl.

Other aspects of the invention will become apparent by consideration of the detailed description and accompanying drawings.

BRIEF DESCRIPTION OF THE DRAWINGS

The application file contains at least one drawing executed in color. Copies of this patent application publication with color drawings will be provided by the Office upon request and payment of the necessary fee.

DETAILED DESCRIPTION

Figure 1A:
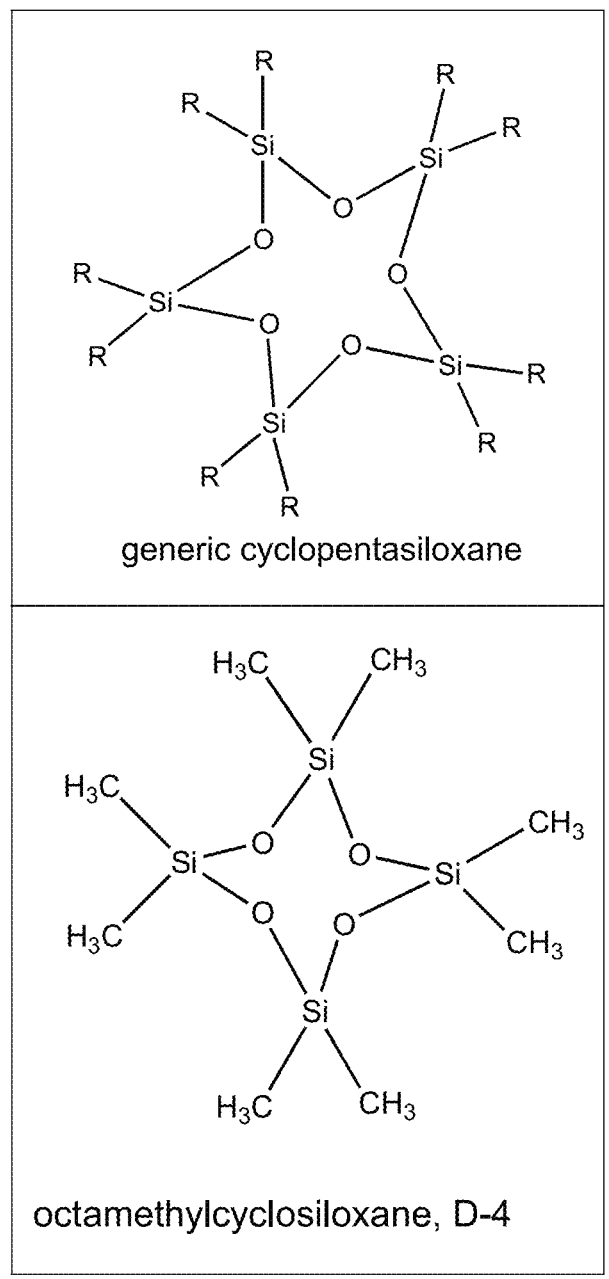
FIG. 1A shows an example of cyclosiloxanes $(R_2SiO)_n$ (n=5 or 4).
Figure 1B:
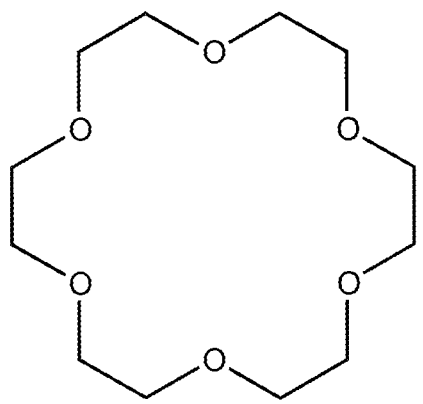
FIG. 1B shows an example of crown ethers $(CH_2CH_2O)_n$ (n=6 or 4).
Figure 1B:
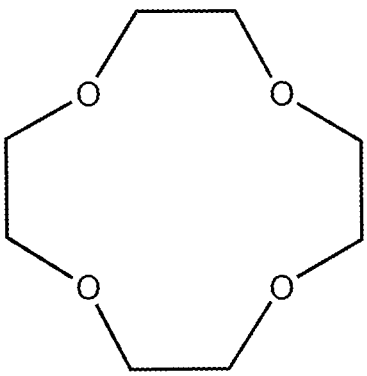
Figure 2:
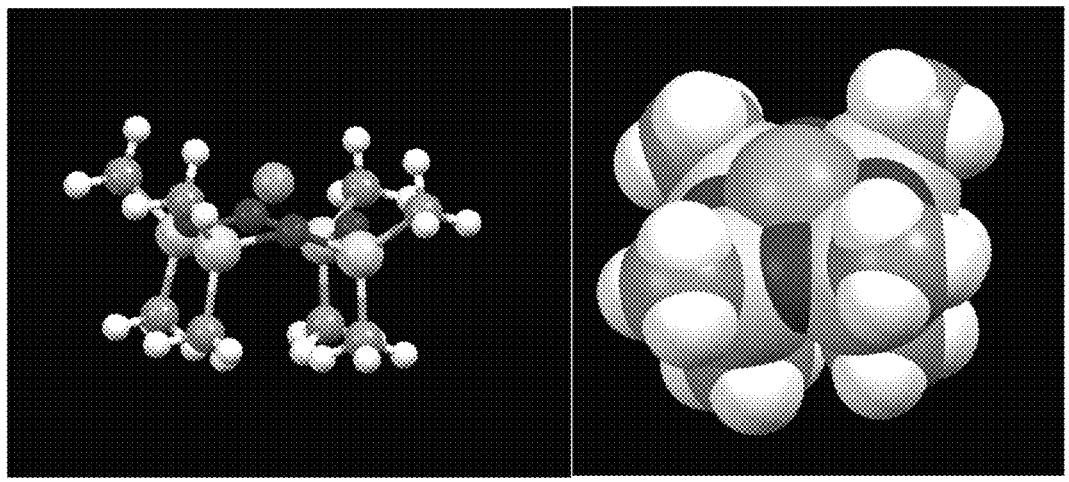
FIG. 2 shows a minimum energy conformation for D-4/Li$^+$, which has a crown-like appearance (red=oxygen, gold=silicon, grey=carbon; white=hydrogen; violet=lithium). The structure deviates slightly from four-fold (C4) symmetry (selected geometric parameters are provided in Table 4).

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways.

The terms "comprise(s)," "comprising," "include(s)," "including," "having," "has," "contain(s)," "containing," and variants thereof, as used herein, are open-ended transitional phrases, terms, or words that are meant to encompass the items listed thereafter and equivalents thereof as well as additional items. The singular forms "a", "and", and "the" include plural references unless the context clearly dictates otherwise. Where the term "comprising" is used, the present disclosure also contemplates other embodiments "comprising," "consisting of," and "consisting essentially of," the embodiments or elements presented herein, whether explicitly set forth or not. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated in this specification. These are only examples of what is specifically intended, and all possible combinations of numerical values between and including the lowest value and the highest value enumerated are to be considered to be expressly stated in this application.

The modifier "about" used herein in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in Organic Chemistry, Thomas Sorrell, University Science Books, Sausalito, 1999; Smith and March March's Advanced Organic Chemistry, 5th Edition, John Wiley & Sons, Inc., New York, 2001; Larock, Comprehensive Organic Transformations, VCH Publishers, Inc., New York, 1989; Carruthers, Some Modern Methods of Organic Synthesis, 3rd Edition, Cambridge University Press, Cambridge, 1987; the entire contents of each of which are incorporated herein by reference.

The term "alkyl" as used herein, means a straight or branched chain saturated hydrocarbon. Representative examples of alkyl include, but are not limited to, methyl, ethyl, npropyl, isopropyl, n-butyl, sec-butyl, isobutyl, tert-butyl, n-pentyl, isopentyl, neopentyl, n-hexyl, 3-methyl-hexyl, 2,2-dimethylpentyl, 2,3-dimethylpentyl, n-heptyl, n-octyl, n-nonyl, and n-decyl. A designation "$C_{1-10}$" or "$C_{1-4}$" may be used to indicate the number of carbon atoms present in the alkyl group as generally understood by those skilled in the art. Where a range is given, as in "$C_{1-10}$," the alkyl may have any number of carbon atoms falling within the recited range. A "$C_{1-10}$alkyl," for example, is an alkyl group having from 1 to 10 carbon atoms, however arranged (straight chain or branched).

The present disclosure relates to method of extracting metal ions using a cyclosiloxane compound. For example, the metal ions may be lithium ion from an aqueous solution, such brine and seawater.

Cyclosiloxanes having a structure of $(R_2SiO)_n$ are used in, or derived from, a variety of consumer and industrial materials. For example, when R is methyl ($-CH_3$) and n is 4, the cyclosiloxane is known as octamethylcyclotetrasiloxane, or D-4. Compared to crown ethers, cyclosiloxanes have a similar, repeating oxygen atom pattern. Crystal structures have been reported for salts formed from chelates between either decamethylpentacyclosiloxane (D-5) or dodecamethylhexacyclosiloxane (D-6) with lithium ion ($Li^+$), accompanied by a large counterion. Surprisingly, the present disclosure demonstrates that cyclosiloxanes, such as D-4, may contain high affinity toward lithium ion, and that cyclosiloxanes may be effectively used for extracting lithium ions from a source material. In particular, D-4 may be advantageously used for extracting lithium from brine or seawater with high yield and selectivity.

D-4 has a density at 0.956 g/ml, which is relatively close to water (0.998 g/mL). D-4 has a rather low solubility in water at 0.056 mg/L at 23° C., which is sufficient for trace amount of D4 to dissolve in environmental aquifers. A higher amount of D-4 in water results in two cleanly separable layers. Without being limited to any theory, it is hypothesized that the size and/or partial negative charge of the ring structure of D-4 allows D-4 to coordinate with positively charged metal ions, such as lithium ions ($Li^+$), with sufficient affinity or selectivity, such that the metal ions may be extracted from the an aqueous source. As provided herein, D-4 may be used to extract lithium with high yield from aqueous sources, such as industrial waste and natural water (e.g., brine, lake water, or seawater). Thus, the present disclosure provides significant improvement over the exiting lithium recovery techniques (such as the current brine-based extraction methods).

The term "complex" as used herein refers to any structure results from the association of a metal ion and an organic compounds as disclosed herein. The complex may be a coordination complex formed by the metal ion and the organic compound, as generally understood in the art. The interaction between the metal ion and the compound may depend on the size, charge, and electron configuration of the metal ion and the compound, but is not limited not to any particular type of interaction (e.g., electrostatic interactions, ionic interactions, or a combination thereof) or stoichiometry (e.g., molar ratio of 1:1) between the metal ion and the compound.

The term "extraction," "sequestration," "chelation," or the like, as used herein refers to a transfer of a metal ion from its original environment (e.g., an aqueous solution) into a different material (e.g., a layer of organic material separate from the aqueous solution). The "extraction" or "sequestration" may result from the formation of a complex between the metal ion and an organic compound as described herein. For example, the metal ion may be a lithium ion, and the compound may be a cyclosiloxane compound as disclosed herein. In some embodiments, lithium ions are extracted from an aqueous solution by the cyclosiloxane compound, resulting in a transfer of the lithium ions from the aqueous phase into a separate, water-insoluble phase that is dominantly the cyclosiloxane compound (e.g., a neat compound). The cyclosiloxane phase may be conveniently separated from the aqueous phase after the extraction of the metal ion.

In one aspect, the present invention provides a method of extracting a metal ion from a source, the method comprising:

contacting a compound of formula $(R_2SiO)_n$ with the metal ion in the source, whereby the compound and the metal ion form a complex;

wherein each R is independently selected from $C_{1-10}$alkyl, and n is 3-10.

In some embodiments, the metal ion is a lithium ion.

In some embodiments, the source of the metal ion comprises the metal ion and a counterion. For example, the counterion may be one selected from the group consisting of $F^-$, $Cl^-$, $Br^-$, $I^-$, $HSO4^-$, $SO_4^{2-}$, $HCO_3^-$, $CO_3^{2-}$, $B(OH)_4^-$, $B_2O_5^{4-}$, $B_3O_7^{5-}$, $B_4O_9^{6-}$, $NO_3^-$, $H_2PO_4^-$, $HPO_4^{2-}$, $PO_4^{3-}$, and a combination thereof. In some embodiments, the metal ion is lithium ion, and the counterion is $F^-$, $Cl^-$, $Br^-$, $I^-$, $HSO4^-$, $SO_4^{2-}$, $NO_3^-$, $H_2PO_4^-$, $HPO_4^{2-}$, $PO_4^{3-}$, or a combination thereof. In some embodiments, the metal ion is lithium ion and the counterion is $Cl^-$.

In some embodiments, the compound is a compound of formula (I):

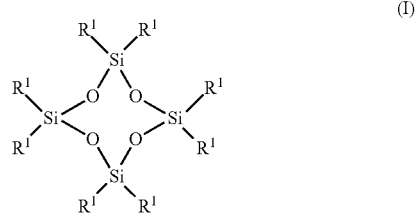

(I)

wherein each $R^1$ is independently selected from $C_{1-4}$alkyl.

In some embodiments, the compound is a compound of formula (I), wherein each $R^1$ is independently methyl, ethyl, propyl, or isopropyl. In some embodiment, the compound is a compound of formula (I), wherein each $R^1$ is independently methyl or ethyl.

In some embodiments, the compound is a compound of formula (I), wherein the $R^1$ groups are different or the same. In some embodiments, the compound is a compound of formula (I), wherein the $R^1$ groups are the same.

In some embodiments, the compound used in the present method is octamethylcyclotetrasiloxane (D-4), having a structure of

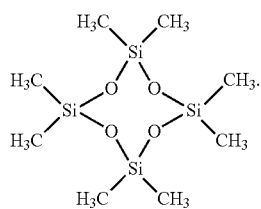

In some embodiments, the compound is distilled before being used in the present methods. Upon distillation, the compound (such as D-4) may be free of any detectable metal ions, or contain only a residue amount of metal ions at such low concentration that the presence of the metal ion in the compound does not interfere with the methods disclosed herein. In particular embodiments, the compound may be distilled D-4, and the residue metal ions in D-4 after distillation (if any) does not reduce the efficiency or yield of the extraction method (such as lithium ion extraction) as disclosed herein.

In some embodiments, the source of the metal ion comprises an aqueous solution. For example, the aqueous solution may be a solution obtained from nature (such as seawater), a solution derived from industrial waste or laboratory waste, or other toxic or non-toxic solutions. In some embodiments, the source of the metal ion is natural or artificial brine, which is an aqueous solution containing about 1% to about 30% salt (e.g., sodium chloride) in water. The brines as disclosed herein may also contain lithium, magnesium, potassium, bromine, iodine, and other materials.

In some embodiments, the source of the metal ion is an aqueous solution obtained from nature. In particular embodiments, the source of the metal ion is natural brine, seawater, or a combination thereof.

The pH value of the source of the metal ion as disclosed herein may be from about 1 to about 12. The pH value of the source of the metal ion may be at least 1, at least 2, at least 3, at least 4, at least 5, at least 6, at least 7, at least 8, at least 9, at least 10, or at least 11. The pH value of the source of the metal ion may be less than 12, less than 11, less than 10, less than 9, less than 8, less than 7, less than 6, less than 5, less than 4, less than 3, or less than 2. In some embodiments, the pH value of the source of the metal ion is from about 2 to about 10, from about 2 to about 8, from about 2 to about 6, from about 2 to about 5, and from about 2 to about 4. In some embodiments, the pH value of the source of the metal ion is from about 2 to about 4. In particular embodiments, the pH value of the source of the metal ion is about 2.0, about 2.5, about 3.0, about 3.5, or about 4.0.

The concentration of the metal ion in the source may be about $1 \times 10^{-6}$ M to about $1 \times 10^{-1}$ M. The metal ion concentration may be at least $1 \times 10^{-6}$ M, at least $5 \times 10^{-6}$ M, at least $1 \times 10^{-5}$ M, at least $5 \times 10^{-5}$ M, at least $1 \times 10^{-4}$ M, at least $5 \times 10^{-4}$ M, at least $1 \times 10^{-3}$ M, at least $5 \times 10^{-3}$ M, or at least $1 \times 10^{-2}$ M. The metal ion concentration may be less than $1 \times 10^{-1}$ M, less than $1 \times 10^{-2}$ M, less than $5 \times 10^{-3}$ M, less than $1 \times 10^{-3}$ M, less than $5 \times 10^{-4}$ M, less than $1 \times 10^{-4}$ M, less than $5 \times 10^{-5}$ M, less than $1 \times 10^{-5}$ M, or less than $5 \times 10^{-6}$ M. The metal ion concentration may be about $1 \times 10^{-6}$ M to about $1 \times 10^{-1}$ M, about $1 \times 10^{-6}$ M to $1 \times 10^{-2}$ M, about $1 \times 10^{-6}$ M to $1 \times 10^{-3}$ M, about $1 \times 10^{-6}$ M to about $1 \times 10^{-4}$ M, about $1 \times 10^{-6}$ M to about $1 \times 10^{-5}$ M, about $1 \times 10^{-5}$ M to $1 \times 10^{-1}$ M, about $1 \times 10^{-5}$ M to $1 \times 10^{-2}$ M, about $1 \times 10^{-5}$ M to $1 \times 10^{-3}$ M, or about $1 \times 10^{-5}$ M to $1 \times 10^{-4}$ M. In some embodiments, the metal ion concentration is about $1 \times 10^{-6}$ M to about $1 \times 10^{-3}$ M, such as about $1 \times 10^{-5}$ M to about $1 \times 10^{-3}$ M, about $1 \times 10^{-5}$ M to about $5 \times 10^{-4}$ M, or about $1 \times 10^{-5}$ M to about $1 \times 10^{-4}$ M. In some embodiments, the metal ion concentration is about $1 \times 10^{-5}$ M to about $1 \times 10^{-4}$ M. In particular embodiments, the metal ion is lithium ion, and the source is an aqueous solution, in which the concentration of the lithium ion is about $1 \times 10^{-5}$ M to about $1 \times 10^{-4}$ M.

The volume ratio between the compound and the source of the metal ion may be about 1:200 to about 1:1. The volume ratio may be at least 1:200, at least 1:150, at least 1:100, at least 1:90, at least 1:80, at least 1:70, at least 1:60, at least 1:50, at least 1:40, at least 1:30, or at least 1:20. The volume ratio may be less than 1:1, less than 1:5, less than 1:10; less than 1:20; less than 1:30; less than 1:40; less than 1:50; less than 1:60; less than 1:70; less than 1:80; less than 1:90; less than 1:100; or less than 1:150. In some embodiments, the volume ratio is about 1:100 to about 1:1, about 1:100 to about 1:5, about 1:100 to about 1:10, about 1:80 to about 1:10, about 1:60 to about 1:10, about 1:60 to about 1:20, about 1:60 to about 1:30, about 1:60 to about 1:40, about 1:50 to about 1:5, about 1:50 to about 1:10, about 1:50 to about 1:20, about 1:50 to about 1:30, or about 1:50 to about 1:40. In particular embodiments, the volume ratio between the compound and the source of the metal ion is about 1:60 to about 1:40, including but not limited to about 1:60, about 1:55, about 1:50, about 1:45, or about 1:40.

In some embodiments, the metal ion is lithium ion in an aqueous solution at concentration of about $1 \times 10^{-5}$ M to about $1 \times 10^{-4}$ M, and the method is carried out at a volume ratio between the compound and the solution of about 1:60, about 1:50, or about 1:40.

In some embodiments, the present method further comprises pre-treating the source of the metal ion before contacting the compound of formula (I) with the source. For example, in some embodiments, the source of the metal ion comprises seawater, which is pretreated using known methods to yield a treated solution, and the metal ion of interest may then be extracted from the treated solution by the method disclosed herein.

In some embodiments, the present method further comprises isolating the metal ion from the complex. For example, in certain embodiments, the complex formed by the compound of the present disclosure and the metal ion may be isolated from the source of the metal ion using known techniques, such as centrifugation, precipitation, or chromatography. The metal ion may then be purified from the isolated complex.

The present disclosure may have multiple aspects, illustrated by the following non-limiting example.

EXAMPLES

Example 1. Extraction of Lithium Ion by Octamethylcyclotetrasiloxane (D-4)

Materials and Methods.

Octamethylcyclotetrasiloxane (D-4, CAS Number 556-67-2, 98%, Sigma-Aldrich) were purified by vacuum distillation to remove lithium before use. Other commercial materials were used without purification. Seawater was obtained from nature or commercial supplier (e.g. pet store), and was mixed with a small amount of chloroform before use.

$^{13}$C and $^{29}$Si NMR analyses (1:1 solutions with deuterochloroform) were performed using a JEOL ECX-400 MHz spectrometer. FTIR spectroscopy was performed on neat films using an ATR accessory on the JASCO-4100 FTIR. Diluted samples (1:10 macrocycle to acetone) were analyzed by atomic absorption (AA) spectroscopy in emission mode (6710 nm) using a Perkin Elmer AAnalyst 200 flame AA spectrometer. AA standard solutions were diluted with 50:50 by volume in acetone to give concentrations of 0.5, 2.0 and 3.5 ppm LiCl.

Calculations were performed using Spartan '10 on a Macintosh workstation (Wavefunction, Inc. Irvine, Calif.). A D-4 structure of S-4 symmetry was built in the Spartan '10 interface, and subjected to geometry minimization using density functional theory, with the M06 functional (Shao et al., Advances in Methods and Algorithms in a Modern Quantum Chemistry Program Package, *Phys. Chem. Chem. Phys.*, 2006, 8, 3172) and the 6-31G* basis set. Conformational search was performed to generate unique MMFF conformers, that were then minimized using the same M06-6-31G* functional. A $Li^+$ ion was placed in the center of the macrocycle to create transition state structure, and a starting point for optimization of the $Li^+$/D4 complex. Calculations were performed with a finite number chloroform molecules (one per face and two per face), coordinated to D4-$Li^+$.

General Procedure for Lithium Extraction.

Lithium sample was prepared by dissolving LiCl solid (Sigma-Aldrich) in an aqueous buffer to form a solution. Solutions having 1 M LiCl were prepared at pH 1, 3, 6, 8, 10, and 12 with aqueous buffers (Table 1). A sample of seawater containing 1 M LiCl (pH approximately 8.0) was also prepared by dissolving LiCl solid in seawater. Each of 1 M LiCl samples was then diluted to prepared a series of diluted samples containing $1\times10^{-5}$ M, $1\times10^{-4}$ M, $1\times10^{-3}$ M, $1\times10^{-2}$ M, and $1\times10^{-1}$ M LiCl, respectively.

TABLE 1

Buffers for D-4 extraction

| Buffer pH | Component 1 | Component 2 | Ratio (comp1:cmp2) |
|---|---|---|---|
| 1 | $H_3PO_4$ | $NaH_2PO_4$ | 50:1 |
| 2 | $H_3PO_4$ | $NaH_2PO_4$ | 10:1 |
| 3 | Acetic acid | Sodium acetate | 50:1 |
| 4 | Acetic acid | Sodium acetate | 5:1 |
| 5 | Acetic acid | Sodium acetate | 1:2 |
| 6 | $NaH_2PO_4$ | $Na_2HPO_4$ | 10:1 |
| 7 | $NaH_2PO_4$ | $Na_2HPO_4$ | 1:1 |
| 8 | $NaH_2PO_4$ | $Na_2HPO_4$ | 1:10 |
| 9 | $NH_4Cl$ | $NH_4OH$ | 2:1 |
| 10 | $NH_4Cl$ | $NH_4OH$ | 1:5 |
| 11 | $Na_2HPO_4$ | $Na_3PO_4$ | 100:1 |
| 12 | $Na_2HPO_4$ | $Na_3PO_4$ | 10:1 |

Typically, to 10-50 mL of each of the lithium samples in a container was added 1-2 mL of D4 or D5. In particular tests, extractions were performed with 2 ml D-4 to 2 ml aqueous LiCl; 2 mL D-4 to 10 mL LiCl; or 2 mL D-4 to 50 mL LiCl. Extractions were performed largely in glass Erlenmeyer flasks (room temperature water bath shaking for 2-5 days) or in 50-125 mL separatory funnels (manual shaking at room temperature for about 20 min). For samples having pH 10 or pH 12, Teflon containers were use, while all other samples were processed in glass containers (e.g., Pyrex Erlenmeyer flasks).

The samples were placed into a shaker bath and shaken for 2-5 days at room temperature (e.g., 20-25° C.). Alternatively, the samples were shaken manually for about 20 minutes. Under these conditions, it was observed that the two shaking methods (mechanical shaking for 2-5 days vs. manual shaking for about 20 minutes) yielded nearly identical extraction results.

The extraction mixture was then allowed to settle such that two separate layers (namely, the D-4 or D-5 layer and the aqueous solution layer) were obtained. The D-4 or D-5 layer was then separated from the aqueous phase, and was dried over anhydrous calcium chloride ($CaCl_2$, Fisher) before further analysis (e.g., $^{29}$Si NMR). The aqueous layer was evaluated by AA Flame emissions intensity was used to determine lithium concentrations before and after extraction (emission mode, acetylene flame air as oxidant, wavelength used was 670.78 nm, slit was 1.8/0.6 mm). D-4 analysis was also performed using JASCO 4100 FTIR, 400-650 $cm^{-1}$ resolution±1 $cm^{-1}$; also expanded from 1000-1150 $cm^{-1}$, same resolution.

In some experiments, LiCl salt was isolated from the D-4 layers by a series of steps, including vacuum distillation to remove D-4, washing the residue with hexane, centrifuging the hexane layer, pipetting away hexane, and evaporating remaining solvent at ambient pressures via air flow.

In some experiments, hexane was used to remove residual D-4 from the aqueous layer after extraction, as verified by GC/MS.

The LiCl yield varied depending on the parameters of the extraction process. Typically, a yield of up to 95% was obtained based on the calculated amount of lithium recovered from a single extraction, depending on concentrations and the ratio of volumes for aqueous solution and D-4.

Extraction Conditions

AA analysis indicates that the commercially available D-4 contains a detectable amount of lithium species, which shows a strong affinity of D-4 toward lithium ions from aqueous solutions of varied pH and containing multiple ions. In some experiments, the presence of residual lithium in D-4 reduced the efficacy of D-4 to extract lithium ions from aqueous solutions and/or caused inconsistent results. Accordingly, for the extraction experiments herein, the commercial D-4 was distilled to remove any residual lithium before use.

AA analysis data showed reduction of the amount of lithium in the aqueous samples after exposure to distilled D-4, indicating that lithium was extracted by D-4. Approximately 93% to 94.4% of the $Li^+$ in a 50 mL aqueous sample at $1.0\times10^{-5}$ M LiCl was extracted by 1 mL distilled D-4. By comparison, approximately 0.44% to 3.81% of the $Li^+$ in a 50 mL aqueous sample at $1.0\times10^{-4}$ M LiCl was extracted by 1 mL distilled D-4. These results indicate that more D-4 would be needed to extract LiCl from a more concentrated solution. In some experiments, a 1:50, 1:5, or 1:1 volume ratio between D-4 and the aqueous LiCl solution were used depending on the LiCl concentration. For example, an extraction was performed using a 10 mL of D-4 and 10 mL of $1.0\times10^{-3}$ M LiCl solution (1:1 mixture).

The effect of the pH, as well as the effect of the presence of other ions, on the extraction of $Li^+$ from aqueous solutions by D-4 were examined, and the approximate concentration of the $Li^+$ ions extracted was determined. The aqueous solutions extracted had pH ranging from 1 to 12, and included seawater; all extracts showed blue-shifts in the Si—O stretches in the IR spectra, as well as deshielding in the $^{13}$C and $^{29}$Si NMR spectra resonances (Table 2). The largest deviations from the D-4 standard were observed for the sample extracted from LiCl solution at pH 3. Based on AA absorptions versus LiCl standard solutions, there is approximately one Li+ ion extracted for every 1000 D-4 molecules. The smaller experimental changes in Si—O peak stretching and chemical shift changes observed, compared to those calculated may be due to the low concentration (<1%) of D-4/Li$^+$ complexes within the D-4 phase.

Structural Characterization

D-4/Li$^+$ Interaction.

The interaction between Li$^+$ and D-4 or D-5 was investigated with chloride (Cl$^-$) as the counterion. Without being limited by any theory, it was hypothesized that Li$^+$ (along with the counterion) are extracted by D-4 or D-5 from an aqueous solution, such that the Li$^+$ ion is incorporated into the non-polar cyclic siloxane layers, as evidenced by a bright pink flame when such layer is heated with a Bunsen burner. Here, D-4 and D-5 phases were used to extract aqueous LiCl solutions, and the results were characterized by instrumental analyses (FTIR, NMR and AA). A molecular model was calculated using density functional theory to determine likely structure(s) for the D-4/Li$^+$ complex.

The instrumental analyses (FTIR, $^{29}$Si, and $^{13}$C NMR) failed to show significant differences between pure D-5 and D-5 that had been treated with aqueous LiCl. From these data, it was hypothesized that the lithium ion concentration in the D-5 extract was minimal under these experimental conditions.

In contrast, the data (Table 2) clearly shows differences between neat D-4 and the phase containing D-4 with Li$^+$. The AA signal reveals a strong emission at 6710 Angstroms, indicating the presence of Li$^+$ in the D-4-Li$^+$ sample, while none is evidenced in pure D-4. The FTIR spectrum for the complex lacked any peaks in the OH stretching region, indicating the neat D-4/Li$^+$ sample has very little, if any water content. Comparing the FTIR spectra for the samples with and without lithium, the broad, strong Si—O stretching band is blue-shifted upon addition of Li$^+$ by nearly 2 cm$^{-1}$. This shift is in same direction, but smaller magnitude, than in the simulated spectrum calculated by Spartan (5 cm$^{-1}$), and provides support for the proposed structure. NMR spectra for $^{29}$Si and $^{13}$C nuclei show clear differences between D-4 in CDCl$_3$ with and without Li$^+$. The high symmetry in the D-4 structure suggests that there are as few as one chemically unique $^{29}$Si and 13C resonance, if the molecule has four-fold symmetry. The single resonances for $^{29}$Si and $^{13}$C spectra indicate that the structure is nearly symmetric, or if not symmetric, is equilibrating faster than the NMR time scale. The $^{29}$Si NMR signals shifts slightly downfield when Li$^+$ is present, by 0.04 ppm. This is very different from the gas phase chemical shift change predicted by Spartan (+20 ppm), and likely due to lack of solvent in the computational model. The $^{13}$C NMR spectra show even a smaller deshielding effect (−0.01 ppm) upon addition of Li$^+$, consistent in direction but smaller than calculated values.

TABLE 2

Summary of Instrumental Data for D-4 (neat) and D-4/Li$^+$ solution

| System/method | D-4 Si—O exp | D-4/Li$^+$ Si—O exp* | Change, exp | Change, calc** |
|---|---|---|---|---|
| FTIR Si—O stretch, cm$^{-1}$ | 1071.26 (s) | 1073.19 (s) | 1.93 | 5 |
| $^{29}$Si (79.5 MHz) NMR peaks, δ ppm (intensity) | −18.92 | −18.88 | −0.04 | +20.1 |
| $^{13}$C NMR (100 MHz) peak, δ ppm | 0.649 | 0.659 | −0.01 | −0.678 |

TABLE 2-continued

Summary of Instrumental Data for D-4 (neat) and D-4/Li$^+$ solution

| System/method | D-4 Si—O exp | D-4/Li$^+$ Si—O exp* | Change, exp | Change, calc** |
|---|---|---|---|---|
| AA emission at 6710 nm, intensity | 0 | >50 K | NA | NA |

*pH = 3 extract
**M06-HF 6-31G*; difference in average values

Using the Spartan'10 interface and tools, multiple conformers of D-4 were generated, and all converged to within 0.2 kJ/mol to the same structure (Minimized using M06-6-31 G* functional). This D-4 conformer (A) had no negative vibrations, indicative of a true minimum structure, and was slightly distorted from four-fold symmetry. A Li$^+$ ion was placed in the center of the minimized structure to generate a nearly planar D-4/Li$^+$ complex (C), which was subjected to geometry minimization, whereupon the Li$^+$ ion moved out of the approximate plane to the ring to give structure (B). The D-4/Li$^+$ complex (B) was verified to be a minimum by the absence of negative vibrations in the Hessian. A single point energy calculation was also performed for the planar structure, (C), presumed to be the highest energy conformation possible in conversion from one conformer to its mirror image. Using the energies from Spartan, binding of the lithium ion by D-4 is predicted to be exothermic by 271 kJ/mol in the gas phase, and an energy for inversion of one bound conformer to another of 83.9 kJ/mol.

The complex is not symmetrical, as the bond lengths and angles vary throughout the ring (calculated energies and geometric values and figures are given in Table 3 and Table 4). While the four Si atoms, and the four O atoms themselves make nearly planar rings, the eight Si—O atom pairs deviate from planarity by about 15 deg. The lithium ion is about 35 degrees above the plane formed by the four oxygen atoms, consistent with the puckered structure shown in the supplement. Even though the lithium ion rests above the mean plane of the macrocycle, it resides within the van der Waals radii of the surrounding silicon and oxygen atoms. The steric repulsion of the upward facing methyl groups likely prevent significant interaction of the lithium ion with a second unit of D-4.

TABLE 3

Calculated values in a vacuum using DFT/M06 6-31G* method

| | D-4 Minimum structure (A) | D-4 Li minimum structure (B) | D-4 Li inserted in center of ring (C) | Li$^+$ (D) |
|---|---|---|---|---|
| Energy, kJ/mol | −4668608 | −4688019 | −4687935 | −19140.16 |
| Calculated max Si—O vibration (cm$^{-1}$)* | 1096 | 1101 | | |
| Calculated carbon-13 chemical shift* | 2.92 ± 0.46 (avg of 8 C atoms) | 2.96 ± 0.925 | | |
| Calculated Si-29 shift | −19.59 ± 2.70 (avg of 4 dif) | 12.445 ± 0.858 | | |

*obtained at HF 6-31G* level

TABLE 4

Selected geometric parameters for D-4 Li minimum structure (B)

Distances (Angstroms)

| Li—O | Si—C top | Si—O | C—C bottom | Si—C bottom | C—H | C—Li (closest) | H—Li (closest) |
|---|---|---|---|---|---|---|---|
| 2.013, | 1.879, | 1.690, | 3.596, | 1.869, | 1.10 (1), | 3.798 | 3.602 |
| 2.004, | 1.862, | 1.689; | 3.450, | 1.851, | 1.096 (6), | 3.799 | 3.613 |
| 2.035, | 1.865, | 1.664, | 3.704, | 1.863, | 1.095 (8), | 3.799 | 3.605 |
| 2.023 | 1.867 | 1.661, | 3.710; | 1.843 | 1.094 (5), | 3.786 | 3.591 |
|  |  | 1.699, | (edge) |  | 1.093 (2), |  |  |
|  |  | 1.683; | 5.113, |  | 1.092 (2) |  |  |
|  |  | 1.690, | 5.109 |  |  |  |  |
|  |  | 1.679 | (diag) |  |  |  |  |

Angles (degrees)

| Si—O—Si | O—Si—O | O—Si—C | C—Si—C |
|---|---|---|---|
| 145.46 | 98.67 | 110.9, | 116.1, |
| 145.57 | 99.66 | 112.3, | 118.7, |
| 144.77 | 100.07 | 110.4, | 117.6, |
| 145.17 | 99.01 | 109.1; | 115.0 |
|  |  | 111.3, |  |
|  |  | 109.7; |  |
|  |  | 112.1, |  |
|  |  | 112.7 |  |

Tortional angles (degrees)

| OOOO | SiSiSiSi | SiSiSiO | OOOLi | SiSiSiC (bottom) | SiSiSiC (top) |
|---|---|---|---|---|---|
| 0.02 | 0.04 | −15.95, | −34.79, | 95.44, | −134.02, |
|  |  | −15.83, | −34.54, | 97.48, | −133.65, |
|  |  | −16.13, | −35.18, | 98.36, | −135.14, |
|  |  | −15.70 | −34.76 | 94.77 | −134.85 |

The calculations of average, standard deviation, and range of chemical shifts for the carbon atoms on D-4 varied little with the conformation, solvation, or presence or absence of the $Li^+$ ion (no more than ±2 for C-13). This is consistent with experimental spectral which showed only small shifts in the averaged peaks on the corresponding spectra. Calculated chemical shifts from the Si atoms showed much greater dependency on conformation, presence of the $Li^+$ ion, and solvation.

Thus, it was demonstrated herein that $Li^+$ ions dissolve in D-4, and that the incorporation of $Li^+$ ions occurs via extraction of aqueous solutions of varying pH, and in the presence of other ions. The small size of the ring, and absence of other colors in the emission flame, indicate that D-4 is selective for $Li^+$ ions. The molecular models used herein suggest an out of plane binding mode for $Li^+$ ions to D-4 that is highly exothermic in the gas phase.

D-4/$Li^+$ Complex.

D-4 is a crown ether analog containing silicon atoms, and the molecule is a partial negatively charged ring capable of bonding to positive charge metal ions (such as $Li^+$). The results herein demonstrates that $Li^+$ fits in the D-4 ring, and that D-4 extraction are useful to recover lithium from brines or seawater (e.g., the Salton Sea or the ocean). The formation of D-4/$Li^+$ complex (e.g., through D-4 sequestering of $Li^+$ from an aqueous solution) was confirmed by NMR and AA Emission Flame analyses.

D-4 structures before and after lithium extraction at various LiCl concentrations were analyzed by using $^{29}$Si NMR (Table 5). Comparing the concentrated and diluted samples, 0.01M LiCl stands as a midpoint between the concentrated and diluted samples, the NMR showed a similarity trend of D-4 to the lower concentrations. The differences in chemical shifts of peaks present ranged from 0.0-0.7 ppm, and were larger for extractions made from solutions with higher concentrations (see Table 5). The NMR trends showed clear deviations on key $^{29}$Si shift upon uptake of $Li^+$, as well as concentration effects on these shift: higher lithium concentrations showed larger changes in chemical shifts. These results demonstrates the structural changes of D-4 as a result of $Li^+$ extraction, and shows that $Li^+$ is sequestered by D-4 forming a D-4/$Li^+$ complex.

TABLE 5

$^{29}$Si NMR variations of D-4 resulting from $Li^+$ extraction

| Sample | NMR | diff. | NMR | diff. | NMR | diff. | NMR | diff. | NMR | diff. |
|---|---|---|---|---|---|---|---|---|---|---|
| 1M LiCl | 35.63 | 0.07 | 6.04 | 0.02 | −18.59 | 0.09 | −34.90 | 0.03 | −84.89 | 0 |
| 0.1M LiCl | 35.58 | 0.02 | 6.04 | 0.02 | −18.54 | 0.04 | −34.90 | 0.03 | −84.89 | 0 |
| 0.01M LiCl | 35.58 | 0.02 | 6.02 | 0 | −18.52 | 0.02 | −34.89 | 0.02 | −84.87 | 0.02 |
| 0.001M LiCl | 35.58 | 0.02 | 6.02 | 0 | −18.56 | 0.06 | −34.89 | 0.02 | −84.87 | 0.02 |
| 0.0001 LiCl | 35.58 | 0.02 | 6.04 | 0.02 | −18.54 | 0.04 | −34.89 | 0.02 | −84.87 | 0.02 |
| D-4 | 35.56 |  | 6.02 |  | −18.50 |  | −34.87 |  | −84.89 |  |

The aqueous layers were analyzed by AA spectroscopy (Table 6). From the AA emission counts, average difference for the two higher concentrations was within the margin of error introduced by diluting the sample of analysis. The average for the lowest concentrations was 11,477 at $1\times10^{-4}$ M LiCl. At higher concentrations, the differences in counts were smaller than the uncertainty introduced by diluting the samples. However, for the two lower concentrations, which were not diluted before analysis, loss of $Li^+$ ions from the aqueous solution was observed as a result of D-4 extraction.

TABLE 6

AA flame emission data for aqueous samples before and after exposure to D-4

| Sample | Avg. before | Avg. after | Diff. Avg. | SD of Diff. |
|---|---|---|---|---|
| 0.1M LiCl | 312707 | 312995 | −289 | 1309 |
| 0.01M LiCl | 138374 | 138375 | −0.67 | 89 |
| 0.001M LiCl | 203103 | 202437 | 666 | 198.9 |
| 0.0001M LiCl | 63464 | 51987 | 11477 | 513.8 |

Thus, the data from both NMR and AA flame analyses clearly demonstrate that D-4 sequesters $Li^+$ from aqueous solution even at $Li^+$ concentrations close to sea water ($10^{-5}$ M), at which between 20-95% of $Li^+$ ions may be removed by an extraction using D-4, depending on relative volumes and whether D-4 is distilled prior to use.

Various features and advantages of the invention are set forth in the following claims.

What is claimed is:

1. A method of extracting a metal ion from a source, the method comprising:
   contacting a compound of formula $(R_2SiO)_n$ with the metal ion in the source, whereby the compound and the metal ion form a complex;
   wherein each R is independently selected from $C_{1-10}$alkyl, and n is 4,
   wherein the metal ion is a lithium ion, and
   wherein the concentration of the metal ion in the source is about $1\times10^{-6}$ M to about $1\times10^{-1}$ M.

2. The method of claim 1, wherein the source comprises the metal ion and a counterion selected from the group consisting of $F^-$, $Cl^-$, $Br^-$, $I^-$, $HSO4^-$, $SO_4^{2-}$, $HCO_3^-$, $CO_3^{2-}$, $B(OH)_4^-$, $B_2O_5^{4-}$, $B_3O_7^{5-}$, $B_4O_9^{6-}$, $NO_3^-$, $H_2PO_4^-$, $HPO_4^{2-}$, $PO_4^{3-}$, and combinations thereof.

3. The method of claim 1, wherein the compound is of formula (I):

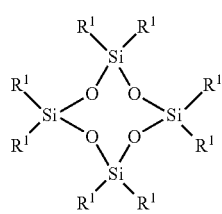

wherein each $R^1$ is independently selected from $C_{1-4}$alkyl.

4. The method of claim 1, wherein the $R^1$ groups are the same.

5. The method of claim 1, wherein the compound is

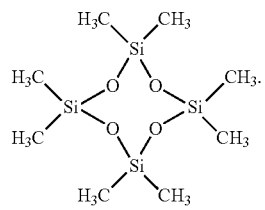

6. The method of claim 1, wherein the source of the metal ion comprises an aqueous solution.

7. The method of claim 1, wherein the source of the metal ion comprises seawater.

8. The method of claim 1, wherein the pH of the source of the metal ion is 1 to 12.

9. The method of claim 1, wherein the pH of the source of the metal ion is 2 to 4.

10. The method of claim 1, further comprising pre-treating the source of the metal ion before contacting the compound of formula (I) with the source.

11. The method of claim 1, further comprising isolating the metal ion from the complex.

12. The method of claim 1, further comprising distilling the compound.

13. The method of claim 1, wherein the concentration of the metal ion in the source is about $1\times10^{-5}$ M to about $1\times10^{-1}$ M.

14. The method of claim 1, wherein the concentration of the metal ion in the source is about $1\times10^{-5}$ M to about $1\times10^{-3}$ M.

15. The method of claim 1, wherein the concentration of the metal ion in the source is about $1\times10^{-5}$ M to about $1\times10^{-4}$ M.

16. The method of claim 1, wherein the volume ratio between the compound and the source of the metal ion is about 1:100 to about 1:1.

17. The method of claim 1, wherein the volume ratio is about 1:50 to about 1:5.

18. The method of claim 1, wherein the volume ratio is about 1:50 to about 1:10.

19. A method of extracting lithium ion from a source, the method comprising:
   contacting octamethylcyclotetrasiloxane with the lithium ion in the source, whereby the octamethylcyclotetrasiloxane and the lithium ion form a complex,
   wherein the source comprises brine or seawater.

* * * * *